Feb. 19, 1957 E. DYKE ET AL 2,782,300

MODULATION METER

Filed March 6, 1952 2 Sheets-Sheet 1

INVENTORS
Edwin Dyke
Henry Magnuski
BY Foorman L. Mueller
Attys.

Feb. 19, 1957 E. DYKE ET AL 2,782,300

MODULATION METER

Filed March 6, 1952 2 Sheets-Sheet 2

INVENTORS
Edwin Dyke
Henry Magnuski

BY Foorman L. Mueller
Atty.

United States Patent Office 2,782,300

Patented Feb. 19, 1957

2,782,300

MODULATION METER

Edwin Dyke, Brookfield, and Henry Magnuski, Chicago, Ill., assignors to Motorola, Inc., Chicago, Ill., a corporation of Illinois Application March 6, 1952, Serial No. 275,188

12 Claims. (Cl. 250—15)

The present invention relates in general to frequency modulated microwave radio communication systems, and more particularly to a method and apparatus for testing and adjusting the relay stations of such a communication system in a manner to maintain a desired frequency deviation over the entire system.

Frequency modulated microwave radio communication systems are now being used to provide telephone, teletype and other signalling functions over comparatively long distances. Such systems may be arranged for multiplex operation with the simultaneous transmission of a plurality of signals from telephone, teletype and other sources. The basic elements of such a system may include frequency shared subcarrier transmitters forming frequency modulated signals for each type of communication signal to be transmitted. The plurality of subcarrier signals are combined and amplified by a so-called "base" amplifier whose output is applied to frequency modulate the klystron or other tube generating the frequency modulated radio energy of microwave frequency. The frequency modulated microwave energy from the klystron is transmitted by means of transmission lines (such as waveguides) and by antennas and reflectors aimed to communicate with antennas, reflectors and waveguides of a relay station at a remote point. Each relay station is provided with a superheterodyne receiver including a local oscillator consisting of a klystron tube and suitable waveguide crystal mixer to transform the incoming frequency modulated microwave energy to frequency modulated signals with a lower intermediate center frequency suitable for amplification by electron tube amplifier stages. The amplified output from the relay station intermediate frequency amplifier is detected to produce the frequency modulated subcarriers originally transmitted which are still combined in a composite or baseband signal. This signal is then amplified in the baseband amplifier of the relay station whose output is connected to frequency modulate the transmitter klystron of the relay station. A typical communication system may include 10 or more relay stations depending upon the distance between terminal stations. The term baseband amplifier is intended to refer to a broadband or video type of amplifier.

The baseband amplifier for amplifying the subcarrier signals may be either a linear amplifier or may be provided with automatic gain control, wherein the output of the amplifier is maintained substantially constant for varying amplitudes of input signals. In the system being described the frequency deviation of the transmitter klystron is proportional to the amplitude of the subcarrier waves applied thereto. It is therefore apparent that the gain of the baseband amplifier for the terminal and relay stations of the communications systems must be adjusted to provide an optimum amplitude of output signal that will cause a desired optimum frequency deviation for the transmitting klystron.

To illustrate, a particular wide band system may be designed to pass as much as +5 or −5 mc. deviation which deviation may then arbitrarily be called 100%. Then if the system is utilized at a more desirable or optimum deviation of $\pm 3$ mc., we may refer to this deviation as 60%. Therefore, if the modulation level exceeds 100%, the frequency deviation will be greater than the bandwidth of the microwave equipment and will cause serious difficulties such as cross talk, excessive noise and the like. On the other hand if the system is adjusted to produce a modulation of less than 60% modulation, trouble will be encountered due to poor signal to noise ratio and the like. When using a plurality of relay stations, each having a baseband amplifier, the disadvantageous effects of improper gain adjustment for the respective baseband amplifiers producing percentage modulation levels other than the optimum 60% will be cumulative. In other words, the baseband amplifier of each relay station should be adjusted to have unity deviation or modulation gain i. e. a frequency modulated received signal of 3 megacycle deviation should be detected and amplified by the baseband amplifier to produce an outgoing frequency modulated microwave signal which also has a 3 megacycle deviation. If, for example, 10 relay stations in a row are adjusted to have .9 modulation gain instead of unity modulation gain, and if the optimum modulation at the beginning of the system was 60%, at the end of the system such modulation would be only 20%. The performance of a system having such a low modulation will be proportionally poor. On the other hand if the system is adjusted to have a modulation gain of 1.1 per relay, 10 relays of such system will produce from the original 60% modulation a theoretical 155% over modulation, and the amount of distortion or cross talk might make the system useless.

From the foregoing considerations it is apparent that the gain adjustment of the video amplifier for the terminal and relay stations of an F. M. microwave communication system is relatively critical and should be such as to provide unity modulation gain whereby the deviation of incoming frequency modulated microwave signal is exactly reproduced in the outgoing frequency modulated microwave signal. Furthermore, all terminal stations and those relay stations having automatic gain control baseband amplifiers should be adjusted such that the amplitude of the modulation voltage for the transmitter klystron will produce F. M. microwave energy with an optimum 3 megacycle deviation equivalent to 60% modulation.

It is an object of the present invention to provide an improved method and apparatus whereby a terminal station or a relay station of a frequency modulated microwave communication system may be adjusted to provide and maintain a desired optimum modulation deviation of the microwave signals.

A further object of this invention is to provide a simple manner of comparing the frequency deviation of the outgoing signal at a relay station with the frequency deviation of the received signal to permit adjusting the gain at the station so that the deviation is the same.

Another object of the invention is to provide compact portable equipment for adjusting and indicating the adjustment of terminal and relay stations of a frequency modulated microwave communication network at each station location in a manner to produce a desired optimum percentage modulation for the frequency modulated microwave signal.

Still another object of the invention is to provide equipment for quickly and easily adjusting a microwave radio relay station in a manner which assures a minimum of disruption of the communication facilities afforded to the relay network by the microwave station.

A feature of the invention is the provision of portable test and indicating equipment including a portable frequency modulated microwave test transmitter which may be adjusted to produce a test signal having a fixed predetermined frequency deviation during the test.

Another feature of the invention is the provision of a portable microwave radio receiving unit including, a local oscillator and crystal mixer, an intermediate frequency amplifier strip and a meter to indicate the deviation of a frequency modulated microwave signal received by the portable receiver.

Another feature of the invention is the method and apparatus for adjusting and indicating the adjustment of a frequency modulated microwave radio relay station which provides for the application to the input circuits of the station of a modulated test microwave signal and for comparing the frequency deviation of the test signal with the frequency deviation of the outgoing transmitted signal of the relay station when modulated by the test signal, so that the relay station baseband amplifier gain may be adjusted to maintain the deviation of the outgoing signal to be the same as the deviation of the incoming signal.

A further feature of the invention is the provision of a portable frequency modulated microwave generator or transmitter having means to modulate the portable transmitter with modulating signals of adjustably predetermined amplitudes to thereby obtain microwave test signals of different predetermined frequency deviation.

Yet another feature of the invention is the provision of portable equipment including an oscillator for producing a signal simulating the subcarrier signal, the amplitude of which may be adjusted to provide a calibrated R. M. S. voltage level which, when used with a properly adjusted automatic gain control baseband amplifier for terminal station baseband amplifier will produce a 3 megacycle deviation or 60% modulation of the station transmitter klystron.

Still another feature of the invention is the provision of a portable microwave transmitter or generator which is adapted to be connected to the input circuits of a conventional microwave terminal or relay station and which includes a novel wave guide switching mechanism by which the portable transmitting unit may be continuously energized while connected to the relay station without actually applying the microwave energy to the relay station until the test interval when the switching mechanism is operated in a manner to quickly apply the energy from the portable transmitter to the microwave system with a minimum of disruption of the normal communication facilities of the system.

Further objects, features and the attending advantages of the invention will be apparent with reference to the following specification and drawings, in which.

In practicing the invention, portable equipment including a microwave test transmitter unit and a microwave test receiver unit is provided. The test transmitting unit includes a klystron tube and associated wave guide for producing microwave energy which may be connected by a coaxial cable to a waveguide adapter for connection to the incoming signal waveguide plumbing of a microwave radio relay station to be tested. The portable transmitter unit also includes a low frequency oscillator providing a modulation signal which is applied to the test transmitter klystron to frequency modulate the microwave test signal. The test transmitter unit is also provided with the necessary controls for adjusting the center frequency of the microwave test energy to correspond to the operating receiver frequency of the station to be tested.

The portable test receiver unit includes a microwave receiver of the superheterodyne type having intermediate frequency amplifier and detector together with a meter for indicating the frequency deviation of the signal received by the test receiver. The portable equipment further includes a coaxial switch and cabling by means of which the test receiver unit may be connected to the signal received by the relay station under test or to the outgoing signal transmitted by the relay station under test. The deviation meter can be switched to indicate either the deviation of the incoming signal or the deviation of the outgoing signal of the microwave relay station.

By connecting the portable test transmitter to the receiving circuit of the relay station under test in a manner to provide a test signal having a fixed frequency deviation during the test interval, and by operating the coaxial switch so that the deviation meter will indicate either the deviation of the incoming or the deviation of the outgoing signal, the gain of the relay station baseband amplifier may be adjusted to obtain a frequency deviation for the outgoing signal equal to the frequency deviation of the incoming signal.

When adjusting the gain of the baseband amplifier of a terminal relay station or a baseband amplifier of the type having an automatic gain control, it is necessary to inject a test signal voltage to the amplifier having a known R. M. S. level which will produce an actual frequency deviation of a predetermined amount. For example, in one form of relay system with which the invention may be used, an input signal of .1 R. M. S. volt should produce a frequency deviation of the outgoing transmitter of plus or minus 3 megacycles equivalent to 60% modulation level. For such purpose the test receiver deviation meter and baseband amplifier should be suitably calibrated in order that the gain of the terminal station baseband amplifier or the automatic gain control type of baseband amplifier may be adjusted to produce the desired frequency deviation with the calibrated input signal of .1 R. M. S. volt.

Figure 1:
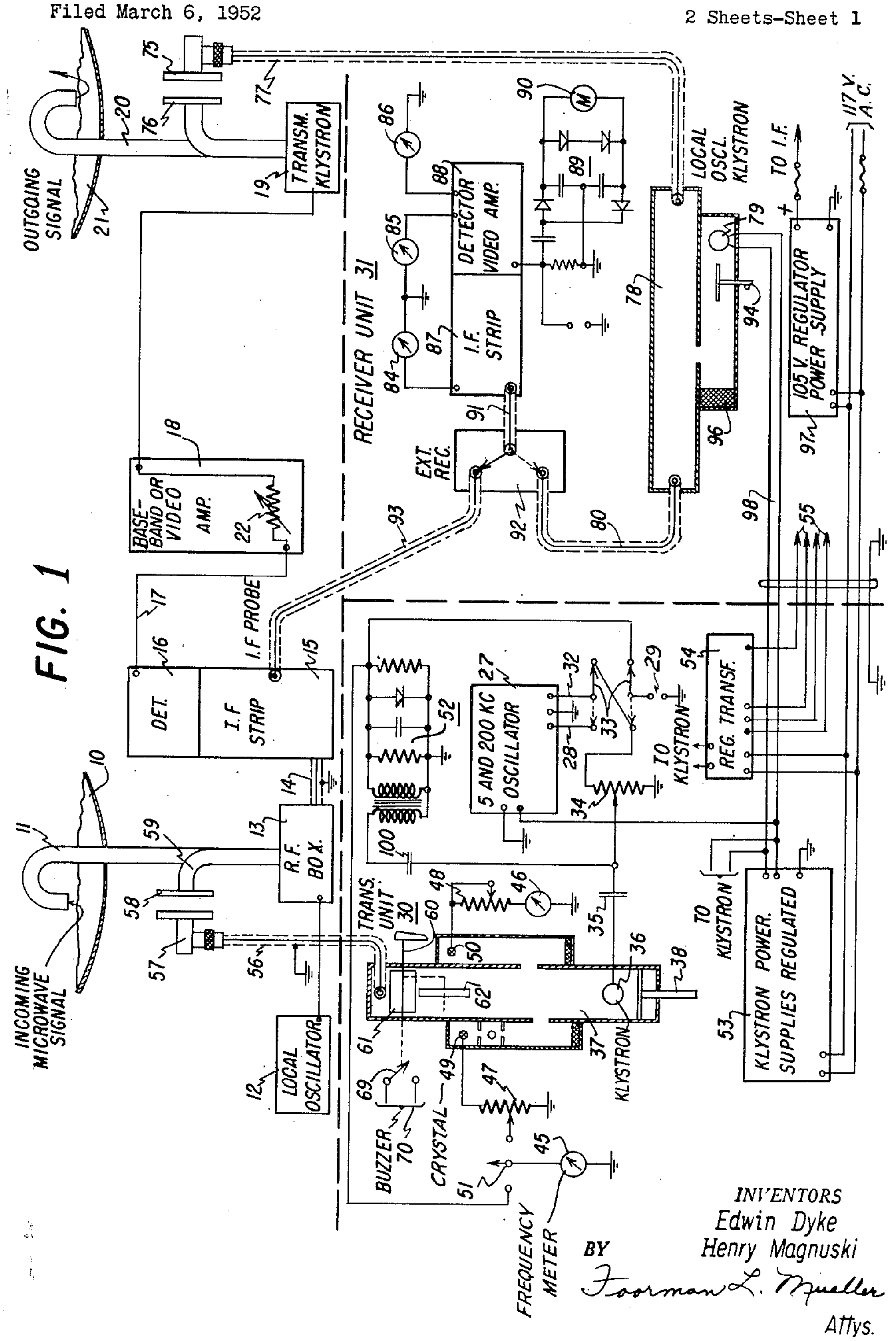
Fig. 1 is a diagrammatic illustration of the portable testing and adjusting apparatus of the invention in association with a form of frequency modulated microwave radio relay station.

With reference to Fig. 1 of the drawings, a more detailed description of the invention will be made. A microwave radio relay station is shown in block outline, although it will be apparent from the following description that the invention may be used with any of the stations of a microwave system including terminal stations as well as relay stations. The relay station includes the parabolic reflector 10 receiving an incoming frequency modulated microwave signal, and reflecting the signal into the wave guide horn 11. The received microwave energy in the wave guide 11 is mixed with the output of a klystron local oscillator 12 by a crystal mixer embodied in the R. F. box 13 to produce a frequency modulated signal with a center frequency lower than the received microwave center frequency. The intermediate frequency output from the R. F. box 13 is connected by the coaxial cable 14 to the intermediate frequency amplifier strip 15 and the frequency modulation limiters and detectors 16. The detected frequency modulated signal or signals are connected by line 17 to a baseband amplifier 18 whose amplified output signal is connected to frequency modulate the transmitter klystron 19 producing the outgoing frequency modulated microwave signal in the wave guide 20 as directed on to the parabolic reflector 21. The amplifier 18 is provided with a variable control 22 whereby its preset gain may be adjusted.

Assuming an incoming microwave signal having a frequency deviation of 3 megacycles, corresponding to 60% modulation of the system, the preset gain of the amplifier 18 may be such that the outgoing signal from the frequency modulated transmitted klystron 19 will have more or less than the 3 megacycle deviation of the incoming signals so that the 60% modulation for the outgoing signal may not be preserved. By adjusting the variable gain control 22, the gain of the relay station may be adjusted to provide unity modulation gain or in other words an amplitude of modulating voltage such that the frequency deviation for the outgoing signal is exactly equal to the frequency deviation of the incoming signal. Variations in tube characteristics due to aging and the like will cause the over-all gain of the relay station and particularly the amplifier 18 to vary, and therefore the gain control 22 must be readjusted from time to time to preserve the desired unity modulation gain.

Figure 2:
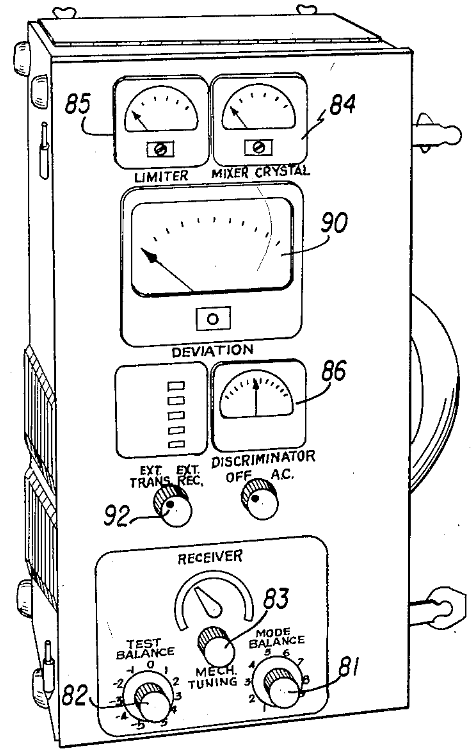
Fig. 2 is a perspective elevation of the test receiver portion of the portable equipment.
Figure 3:
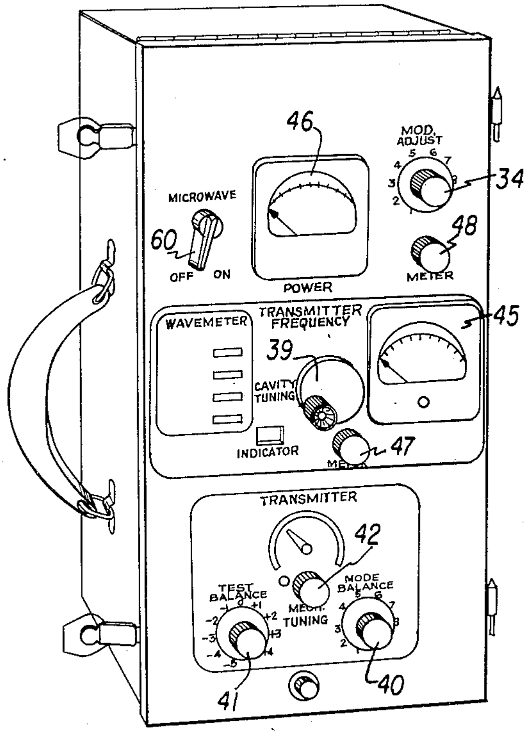
Fig. 3 is a perspective elevation of the test transmitter portion of the portable equipment.

According to the invention, the portable test transmitter unit 30 and portable test receiver unit 31 may be connected to a relay station or a terminal station of a frequency modulated microwave system such as shown in Fig. 1 of the drawings. The external appearances of the portable transmitting unit 30 and the portable receiver unit 31 are shown in Figs. 2 and 3 of the drawings, and reference may be made to Figs. 2 and 3 of the drawings for comparison of the external control elements which have been shown diagrammatically in Fig. 1 of the drawings.

The test transmitter unit 30 includes a low frequency oscillator 27 for providing an output modulation signal at a frequency of either 5 or 200 kilocycles appearing across line 32 and ground. The double-pole double-throw switch 33 connects the output of the oscillator 27 to the variable modulation adjust or amplitude control 34 when in the position shown by the solid lines. The dotted line position of the switch 33 connects the output signal from the oscillator 27 to an internal energy absorbing circuit by line 28 and connects the external jack terminals 29 to the variable amplitude control 34. The external jack terminals 29 enable an external modulation signal to be applied across the adjustable amplitude control 34 in place of the signal from the oscillator 27 when desired.

The signal from the modulation adjust control 34 is applied through the coupling condenser 35 to frequency modulate a klystron tube 36 generating microwave energy within the wave guide 37. The plunger 38 may be adjusted by mechanical tuning means 39 (Fig. 3) for adjusting the impedance of the wave guide 37 and affecting the tuning of the microwave energy from the klystron 36. The electrical circuit (not shown) for predetermining the mode and balance of the klystron may also be adjusted in a conventional manner by means of the controls 40, 41 (Fig. 3). In addition, the mechanical tuning of the klystron tube 36 may be adjusted by means of the control 42 (Fig. 3). When adjusting the mode, balance, and tuning of the klystron 36 and the cavity 37, meters 45 and 46 may be connected through the meter adjustment controls 47 and 48 to crystals 49 and 50 for indicating the frequency and the power, respectively of the energy in the cavity 37. The meter 45 may alternatively be connected by means of the switch 51 and the meter rectifying circuit generally shown at 52 and coupled by condenser 100 to indicate the relative amplitude of the klystron modulating signal appearing across the modulation adjust control 34.

The low frequency modulation oscillator 27 and the transmitter klystron 36 are energized from the regulated high voltage output of the regulated power supply 53. In addition, the filament of the klystron tube 36 and the tube filaments of the low frequency oscillator 27 may be energized from the regulated output of the filament transformer 54 which is also connected by cabling 55 to energize the filaments of the tubes in the test receiver unit 31 to be later described.

The frequency modulated microwave energy output from the transmitter waveguide 37 may be connected by means of the coaxial cable 56 to a wave guide adapter 57. When the wave guide adapter 57 is connected to the flange 58 of the coupling wave guide structure 59 of the relay microwave station, the microwave energy from the waveguide 37 may be received by the R. F. receiver box 13 of the microwave station under test. It is desirable that the portable transmitting klystron 36 be warmed-up or continuously energized before the test.

In order to prevent the microwave energy in the waveguide 37 from being applied to the communication system under test except for a short period of time when the actual adjustments are to be indicated and made, a switch 60 operating a cut-off vane 61 within the waveguide 37 is employed. When the switch 60 is turned to the microwave "on" position, vane 61 will be positioned in a plane parallel to the long axis of the waveguide 37, thus permitting the passage of microwave energy from the klystron 36 into the coaxial cable 56. When the switch 60 is turned to the microwave "off" position, the vane 61 will be positioned in a plane perpendicular to the long axis of the waveguide 37 and an energy absorbing means or attenuation pad 62 will be inserted within the waveguide 37, thus preventing the passage of microwave energy into the coaxial cable 56.

Figures 4, 5:
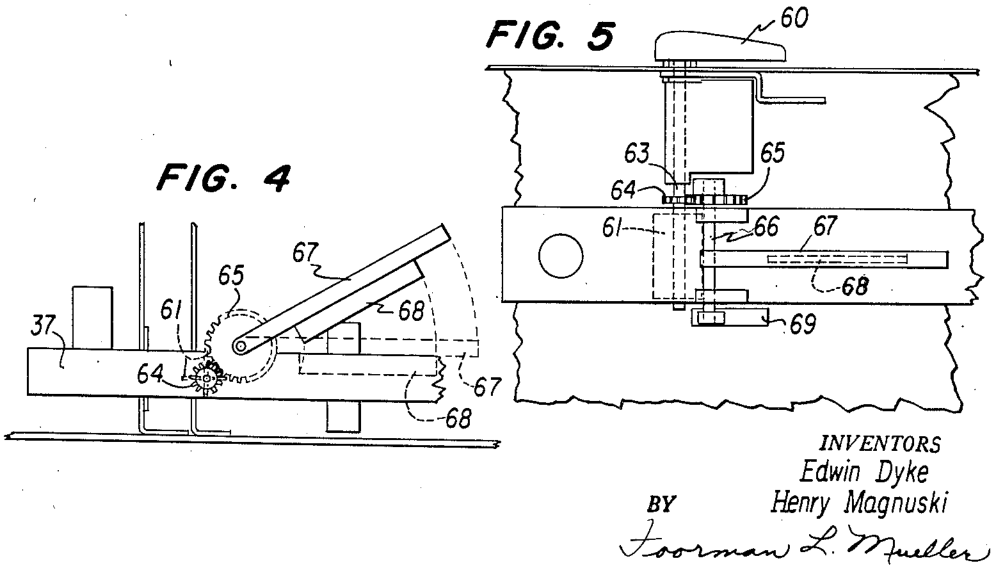
Fig. 4 is a fragmentary detail side elevation of the waveguide switch for controlling the output of the portable microwave test transmitter.
Fig. 5 is a top plan view of the details in Fig. 4.

The mechanical details of a suitable form of waveguide switch 60 are shown in Figs. 4 and 5 of the drawings. The switch handle 60 is keyed to a rotatable shaft 63 on which the vane 61 is also mounted. A pinion gear 64 that is rotatable with shaft 63 engages a pinion gear 65 which is keyed to the rotatable shaft 66. An arm 67 is fixed to the shaft 66, and a microwave energy absorbing element 68 of polyiron or the like is fixed to the arm 67. When the switch 60 is in the microwave "off" position, the vane 61 extends vertically as shown in Fig. 4, and the arm 67 is in the dotted line position with the energy absorber 68 extending through a slot of the waveguide wall 37. Upon moving the switch handle 60 to the "on" position, the gearing 64 and 65 is effective to move the energy absorber 68 out of the wave guide coincidental with the movement of the vane 61 to a position in a plane parallel to the long axis of the waveguide 37. The provision of the switch 60 is very important inasmuch as the application of a test signal of frequency modulated microwave energy from the klystron 36 to the R. F. box 13 of the microwave communication system will completely disrupt communications in view of the fact that the limiter action of the relay station detector 16 will respond only to the stronger test signal and therefore discriminate against the weaker incoming microwave signals. In order to remind an operator that the switch 60 is in the "on" position and disrupting the communication system, a micro switch 69 is actuated to energize a buzzer circuit 70 when the arm 67 is moved to the solid line position.

Referring again to Fig. 1 of the drawings, the portable test receiver unit of the invention will now be described in detail. The wave guide adapter 75 is adapted to be detachably secured to the adapter flange 76, of the wave guide 20 so that the microwave energy of the outgoing signal from the relay station transmitter klystron 19 may be coupled to the coaxial cable 77. The coaxial cable 77 connects with the test receiver wave guide crystal mixer structure 78 which in cooperation with the local oscillator klystron tube 79 produces a corresponding frequency modulated signal of intermediate frequency in the coaxial cable 80. The electrical mode and balance of the local oscillator klystron tube 79 may be adjusted by conventional circuit means (not shown), and controls 81 and 82, shown in Fig. 2, may be provided for such purpose. The frequency of the local oscillator klystron tube 79 is adjusted by the control 83 to tune the receiver unit 31 to the transmitted microwave energy frequency in the waveguide 20. Meters 84, 85, and 86 are provided to indicate the adjustment of the test receiver mixer crystal, limiter stages, and discriminator respectively and are appropriately connected to the test receiver intermediate frequency amplifier and detector and baseband amplifier stages 87 and 88 respectively. The portable receiver unit intermediate frequency amplifier 87 may be similar to the intermediate frequency amplifier 15 of the microwave station under test. The stages 88 of the portable test receiver unit include a frequency detector and a baseband amplifier, and the detected and amplified signal therefrom, is connected to the rectifier circuit 89 and deviation meter 90 which may be calibrated to read the average amplitude of the detected signal directly in terms of deviation or of percentage modulation of a klystron modulated thereby.

The input circuit for the intermediate frequency amplifier 87 of the test receiver unit is connected by the coaxial cable 91 to a coaxial switch 92. The coaxial switch 92 selectively connects the coaxial input cable 91 to the coaxial cable 80 from the test receiver crystal mixer 78, or to the coaxial cable 93 which may be connected to the intermediate frequency amplifier strip of the microwave relay station under test. The local oscillator level may be controlled by the movable vane 94 in a conventional manner, and a polyiron absorber 96 is provided to prevent undesired reflections of the local oscillator signal as is conventional. A regulated D. C. power supply 97 provides the direct current voltage for energizing the test receiver stages 87 and 88. The local oscillator klystron 79 is connected by means of the cable 98 to be energized from the klystron power supply 53 in the transmitter unit and the filaments of all of the tubes in the receiving unit are energized from the cable 55 connecting with the voltage regulator filament transformer 54 in the transmitter unit.

One method of operating the test indicating and adjusting equipment of the invention will now be described in connection with its use at a relay station of a frequency modulated microwave communication system of the general type referred to. The wave guide adapters 57 and 75 of the portable test transmitting unit and the portable test receiving unit, respectively are attached to the respective wave guide flanges 58 and 76 of the relay station under test. The coaxial cable 93 is attached to the intermediate frequency amplifier 15 of the relay station at a suitable point to connect with the frequency modulated intermediate frequency signal. The microwave energy switch 60 for the portable transmitter unit is turned to the "off" position to prevent the passage of microwave energy from the test transmitter waveguide 37 into the wave guide 11 of the relay station during the warm-up period of the test transmitter. The test transmitter and receiver units are then energized, and the transmitter unit is adjusted to the microwave center frequency to which the receiver section of the relay station is tuned. The portable receiver unit 31 is also adjusted to receive the microwave center frequency of the frequency modulated microwave outgoing signal produced by the relay station transmitter klystron 19 in the waveguide 20. The coaxial switch 92 of the portable test receiver unit 31 is adjusted to the external receive position shown by the solid lines on Fig. 1 of the drawings to thus connect the coaxial cable 93 with the coaxial cable 91. The low frequency oscillator 27 of the portable transmitter unit is adjusted to provide a 200 kc. modulation signal and the modulation input output switch 33 is adjusted to the position shown by the solid lines to apply the 200 kc. signal from the oscillator 27 through modulation gain adjust control 34. The modulation adjust control 34 is set to the minimum position, and the frequency meter 45 is connected by the switch 51 to the frequency meter crystal 49 in the portable transmitting cavity 37. Upon advancing the modulation adjust control 34 from the minimum position, the indication of the frequency meter 45 should decrease to show that the microwave energy from the klystron tube 36 is being modulated by the signal from the low frequency oscillator 27.

The next steps in the test and adjustment operation cause a complete disruption of the communication facilities of the relay station, and should therefore be done as quickly as possible. The microwave energy switch 60 is moved to the "on" position to permit microwave energy in the waveguide 37 to pass through the coaxial cable 56 in the waveguide 11 and the R. F. box 13 of the relay station. The frequency modulated intermediate frequency signal in the relay station intermediate frequency amplifier 15 now has a deviation equal to the deviation of the test signal from the portable transmitter 30, and the deviation is indicated by the deviation meter 90 of the receiver test unit. Thereafter the coaxial switch 92 is moved to the dotted line position or external transmit position, and the deviation meter 90 then indicates the deviation of the frequency modulated microwave energy produced by the transmitting klystron 19 of the relay station which is a function of the gain of the relay station baseband amplifier 18. The variable gain control 22 for the relay station baseband amplifier 18 is then adjusted to produce an indication by the deviation meter 90 which is identical with the previous indication when the portable test I. F. strip 87 and detector and amplifier 88 was connected to the intermediate frequency amplifier of the relay station through the coaxial cable 93. After adjustment of the baseband amplifier gain control 22 for the relay station baseband amplifier 18, the microwave energy switch 60 of the portable transmitting unit 30 should again be moved to the "off" position which restores normal communication in the system under test.

A choice of either 5 or 200 kilocycle signals from the low frequency oscillator 29 in the portable transmitter unit is provided to enable the equipment to be used under different conditions of operation. For example, the 5 kc. signal, which is in the audio range, may be used for general trouble shooting and distortion checking. Also, relay stations having drop and insertion equipment include filters of the low pass type. If the station equipment under test does not have the low pass filters, it may be necessary to use an external modulation signal for modulating the test transmitter, and the switch 33 and terminals 29 are used accordingly. Under such conditions the switch 33 is thrown to the dotted line position, and the external modulation signal is connected by the condenser 100 to the meter rectifier circuits 52 for purposes of indicating the amplitude of the external modulation signal.

The foregoing method of operating the test equipment of the invention may be used at all microwave relay stations in a frequency modulated microwave communication system of the type described, except those relay stations in which the baseband amplifier 18 is of the type having an automatic gain control. Those relay stations which use an automatic gain control for the baseband amplifier 18 are required to stabilize the percentage modulation over a long multiplex network including many relay stations linked together and approximately ever third relay station in such a network is provided with the automatic gain control baseband amplifier. The automatic gain control amplifier is designed to provide a substantially constant optimum amplitude of output signal for varying input amplitudes, and the output amplitude is preferably of an amount to produce optimum modulation of the transmitter klystron 19.

In a communication system of the type being described, the automatic gain control baseband amplifier has a condition of operation which is linear for an input signal having an R. M. S. amplitude of about .1 volt. Such a signal will produce an amplitude of output voltage sufficient to modulate the transmitted klystron 19 with an optimum 60% modulation, provided the preset gain of the automatic gain control baseband amplifier is properly adjusted. In order to properly adjust the preset gain of the automatic gain control type of baseband amplifier 18, the test transmitter unit 30 may be used as follows:

The meter 45 is connected by the switch 51 to the meter rectifier circuit 52 for purposes of indicating the amplitude of the modulation signal from the modulation gain control 34. The modulation gain control 34 is adjusted to provide an indicated R. M. S. signal of .1 volt. A cable is then connected from the terminals 29 to the input of the baseband amplifier of the terminal station being adjusted. The switch 33 is thrown to the position shown by the solid line in Fig. 1, and the coaxial switch 92 is thrown to the dotted line position. Under such conditions the modulation signal having the known R. M. S. amplitude of .1 volt is connected to the input terminal station or relay station baseband amplifier 18 of the automatic gain control type, and the preset gain control 22 for the amplifier is adjusted to produce an indicated deviation by the meter 90 of the test receiver unit equivalent to 60% modulation.

An additional use for the test instrument of the invention is in the field of distortion testing. For instance, the distortion of a receiver may be checked by injecting a signal from the transmitter unit of the modulation tester into flange 58, and the output of the system I. F. strip 15 could then be examined with a distortion measuring device such as a panoramic analyzer or any commercially available distortion meter. For such application, the modulation tester transmitter unit 30 is designed to have very low distortion. Similarly, if a modulation of known (small) distortion is impressed on the system transmitter 19, then the distortion of that transmitter may be sampled by the customary modulation tester connection to flange 76 which then makes this signal available at the output connection of the modulation meter I. F. strip 87, from which connection the signal may be sent to a suitable distortion measuring instrument. Similarly, other system characteristics may be measured, such as fidelity or noise, and these measurements may be related to the audio modulation entering a subcarrier if the output of such subcarrier is utilized and connected to the system via the modulation meter units.

In the foregoing, a method and apparatus for adjusting and indicating the adjustment of a frequency modulated microwave communication system has been described. Two typical methods of using the equipment have also been described, the last method having particular reference to an adjustment of the communication system in which 60% modulation is preserved throughout the entire length of the system network. However, it should be understood that the invention is not limited to the two methods of operation described or to a particular application wherein a 60% modulation level is desired, but may be used to adjust the system to have any desired percentage of modulation level. In its basic aspects, the test equipment of the invention is used to adjust the microwave terminal or relay station to have a so-called unity modulation gain such that any predetermined frequency deviation for an input signal produces the same predetermined frequency deviation for the output signal. The portable equipment of the invention as described includes a source of test frequency microwave energy whose frequency deviation may be predetermined, together with means for applying the test energy to the microwave station under test, and also includes a test receiver unit having a baseband amplifier with a fixed gain, and a frequency deviation meter responsive to the output of the fixed gain amplifier of the receiver unit. The portable test transmitter unit, as described, also includes a novel arrangement for enabling the test transmitter to be continuously energized and connected to the microwave system under test without actually injecting the test microwave energy except during the short interval when the adjustments to the microwave station are to be made.

Various modifications may be made within the spirit of the invention and the scope of the appended claims.

We claim:

1. Apparatus for adjusting the modulation deviation of a frequency modulated microwave relay station which includes an incoming frequency modulation receiver having a frequency discriminator, an adjustable gain amplifier, and an outgoing transmitter frequency modulated by the amplified signal from the amplifier; said apparatus including in combination, an auxiliary frequency modulated microwave transmitter to produce a modulated test signal, means for coupling said test signal to the incoming receiver, auxiliary test receiver means, means for coupling said test receiver to the outgoing transmitter, test meter means for indicating the frequency deviation of a modulated wave applied thereto, and switching means connected to said test meter means and including a first conductor adapted to be connected to said incoming receiver at a point ahead of the frequency discriminator thereof and a second conductor connected to said test receiver means for providing the modulated wave from the outgoing transmitter, said switching means selectively connecting said test meter means to the incoming receiver of said relay station and to said auxiliary receiver means, whereby the gain of the amplifier of the relay station may be adjusted to produce the same indication on said test meter means when said test meter means is connected to said auxiliary receiver means, as when said test meter means is connected to the incoming receiver.

2. Apparatus for measuring the modulation deviation of a frequency modulated microwave relay station which includes an incoming frequency modulation receiver having a frequency discriminator, an adjustable gain amplifier, and an outgoing transmitter frequency modulated by the amplified signal from the amplifier; said apparatus including in combination, auxiliary receiver means, means for coupling said auxiliary receiver means to the outgoing transmitter, test meter means for indicating the frequency deviation of a modulated wave applied thereto, and switching means connected to said test meter means and including a first conductor adapted to be connected to said incoming receiver ahead of said frequency discriminator thereof and a second conductor connected to said auxiliary receiving means for providing the modulated signal from the outgoing transmitter, said switching means selectively connecting said test meter means to the incoming receiver of said relay station and to said auxiliary receiver means, whereby the indication on said test meter means when said test meter means is connected to said auxiliary receiver means may be compared with the indication thereon when said test meter means is connected to the incoming receiver to thereby compare the deviation of the outgoing signal with the deviation of the incoming signal.

3. Apparatus for measuring the modulation deviation of a frequency modulated microwave radio relay station which includes an incoming frequency modulation receiver having a frequency discriminator, an adjustable gain amplifier, and an outgoing transmitter frequency modulated by the amplified signal from the amplifier; said apparatus including in combination, a portable frequency modulated auxiliary microwave transmitter for producing a modulated test signal, means for coupling said test signal to the incoming receiver, a portable auxiliary test receiver unit, means for coupling said test receiver to the outgoing transmitter, test meter means connected to said test receiver unit for indicating the frequency deviation of a modulated wave applied thereto, and switching means connected to said test receiver unit and including a portion adapted to be connected to the incoming receiver at a point thereon ahead of the frequency discriminator, said switching means selectively connecting said test receiver unit to the incoming receiver of said relay station so that signals therefrom and signals from the outgoing transmitter may be selectively applied to said test meter means, whereby the indication on said test meter means when said test receiver is connected to said incoming receiver may be compared with the indication thereon when said test receiver is connected to the outgoing transmitter to thereby compare the deviation of the outgoing signal produced by said test signal with the deviation of the incoming signal produced by said test signal.

4. Apparatus for adjusting the modulation deviation of a frequency modulated microwave radio relay station which includes an incoming frequency modulation receiver of the superheterodyne type having an intermediate frequency amplifier, an adjustable gain amplifier, and an outgoing transmitter that is frequency modulated by the amplified signal from the adjustable gain amplifier; said apparatus including in combination, an auxiliary frequency modulated microwave transmitter for producing a modulated test signal, means for coupling said test signal to the incoming receiver, an auxiliary frequency modulation test receiver of the superheterodyne type having a mixer, an intermediate frequency amplifier, a detector, and an output amplifier, means connecting said mixer to the outgoing transmitter, test meter means connected to said output amplifier for indicating the frequency deviation of a modulated wave applied to said detector, and switching means for selectively connecting said intermediate frequency amplifier of said test receiver to the intermediate frequency amplifier of the incoming receiver of said relay station and to said mixer of said test receiver, whereby the gain of the adjustable gain amplifier of the relay station may be adjusted to produce the same indication on said test meter means when said test meter means is connected through said auxiliary test receiver to said outgoing transmitter as when said test meter means is connected to the incoming receiver.

5. Apparatus for adjusting a frequency modulated microwave radio relay station to have unity gain and therefore a predetermined frequency deviation wherein the frequency deviation of the transmitted and received microwave energy is proportional to the amplitude of the modulation signal for the microwave transmitter, the relay station including an incoming microwave receiver, mixer and local oscillator to produce a frequency modulated signal of intermediate frequency, an intermediate frequency amplifier and detector, an adjustable gain amplifier adapted to amplify the signal as detected from the intermediate frequency signal, and an outgoing microwave transmitter to be frequency modulated by the amplified signal from the adjustable gain amplifier; said apparatus including in combination, an auxiliary frequency modulated microwave transmitter to produce a test microwave signal, means to modulate said auxiliary transmitter with a predetermined amplitude of modulation signal to thereby produce a predetermined deviation for the test microwave signal, means to couple the test microwave signal to the incoming microwave input circuit of the relay station, an auxiliary test receiver unit including an intermediate frequency amplifier, detector and amplifier connected to a test meter for indicating the frequency deviation of a signal received thereby, said test receiver unit also including an auxiliary mixer adapted to receive frequency modulated microwave energy and produce a frequency modulated signal of an intermediate frequency therefrom, means to connect the input of the mixer of said test receiver unit to the microwave energy output of transmitter of said relay station, and switching means to selectively connect the input of the intermediate frequency amplifier of said test receiver unit to the intermediate frequency amplifier of said relay station and to the output of the mixer of said test receiver unit, whereby the gain of the adjustable gain amplifier of the relay station may be adjusted to produce an indication on said test meter of a frequency deviation for the frequency modulated microwave energy of the relay station transmitter to be equal to the indicated predetermined frequency deviation of the auxiliary test transmitter to thus enable an adjustment of the relay station adjustable gain amplifier producing unit gain for the microwave relay station.

6. Apparatus for adjusting the modulation deviation of a frequency modulated microwave radio relay station which includes an incoming frequency modulation receiver of the superheterodyne type having an intermediate frequency amplifier, an adjustable gain amplifier, and an outgoing transmitter that is frequency modulated by the amplified signel from the adjustable gain amplifier; said apparatus including in combination, an auxiliary frequency modulated microwave transmitter having a source of modulating voltage of variably controlled amplitude for producing a modulated test signal with a variably controlled frequency deviation, means for coupling said test signal to the incoming receiver, an auxiliary test receiver of the superheterodyne type having an intermediate frequency amplifier and a detector and amplifier, test meter means connected to the amplifier for indicating the frequency deviation of a modulated wave applied to the test receiver, and switching means for selectively connecting said test receiver to the intermediate frequency amplifier of the incoming receiver of said relay station and to said outgoing transmitter, whereby the gain of the amplifier of the relay station may be adjusted to produce the same indication on said test meter means when said test meter means is connected to said outgoing transmitter as when said test meter means is connected to the incoming receiver.

7. Apparatus for adjusting the modulation deviation of a frequency modulated microwave radio relay station which includes an incoming frequency modulation receiver of the superheterodyne type having an intermediate frequency amplifier, an adjustable gain amplifier, and an outgoing transmitter that is frequency modulated by the amplifier signal from the adjustable gain amplifier; said apparatus including in combination, an auxiliary frequency modulated microwave transmitter having a source of modulating voltage of variably controlled amplitude for producing a modulated test signal with a variably controlled frequency deviation, means including a waveguide switch for momentarily coupling said test signal to the incoming receiver during the adjusting interval, an auxiliary test receiver of the superheterodyne type having an intermediate frequency amplifier and a detector and amplifier, test meter means connected to the amplifier for indicating the frequency deviation of a modulated wave applied to the test receiver, and switching means for selectively connecting said test receiver to the intermediate frequency amplifier of the incoming receiver of said relay station and to said outgoing transmitter during the adjusting interval, whereby the gain of the amplifier of the relay station may be adjusted to produce the same indication on said test meter means when said test meter means is connected to said outgoing transmitter as when said test meter means is connected to the incoming receiver.

8. Apparatus for adjusting a frequency modulated microwave radio relay station to have unity gain and therefore a predetermined frequency deviation wherein the frequency deviation of the transmitted and received microwave energy is proportional to the amplitude of the modulation signal for the microwave transmitter, the relay station including an incoming microwave receiver, mixer and local oscillator to produce a frequency modulated signal of intermediate frequency, an intermediate frequency amplifier and detector, an adjustable gain amplifier adapted to amplify the signal as detected from the intermediate frequency signal, and an outgoing microwave transmitter to be frequency modulated by the amplified signal from the adjustable gain amplifier; including in combination an auxiliary frequency modulated microwave transmitter to produce a test microwave signal, means to modulate said auxiliary transmitter with a predetermined amplitude of modulation signal to thereby produce a predetermined deviation for the test microwave signal, means including a wave-guide switch to momentarily couple the test microwave signal to the incoming microwave input circuit of the relay station during an adjustment interval, an auxiliary test receiver unit including an intermediate frequency amplifier, detector and amplifier connected to a test meter for indicating the frequency deviation of a signal received thereby, said test receiver unit also including an auxiliary mixer adapted to receiver frequency modulated microwave energy and produce a frequency modulated signal of an intermediate frequency therefrom, means to connect the input of the mixer of said test receiver unit to the microwave energy output of the transmitter of said relay station during an adjustment interval, and switching means to selectively connect the input of the intermediate frequency amplifier of said test receiver unit to the intermediate frequency amplifier of said relay station and to the output of the mixer of said test receiver unit during an adjustment interval, whereby the gain of the amplifier of the relay station may be adjusted to produce an indication on said test meter of a frequency deviation for the frequency modulated microwave energy of the relay station transmitter to be equal to the indicated predetermined frequency deviation of the auxiliary test transmitter to thus enable an adjustment of the relay station amplifier producing unity gain for the microwave relay station.

9. Portable test apparatus for a frequency modulated microwave radio relay station which includes an incoming frequency modulation receiver, a video amplifier, and an outgoing transmitter that is frequency modulated by the amplified signal from the amplifier, which apparatus requires interrupting communications through the relay station for a short test interval; said apparatus including in combination, frequency modulated microwave test transmitter means for producing a modulated test signal, wave guide means for connecting said test transmitter means to said incoming receiver, said wave guide means including a wave guide switch having a movable vane within said wave guide means for obstructing the flow of microwave energy therethrough and absorbing means for absorbing the microwave energy therein, said switch being operable to withdraw said vane and absorbing means from said wave guide means for momentarily coupling said test signal to the incoming receiver during the test interval to thereby interrupt communications through the relay station, and test meter means adapted to be connected to said radio relay station for indicating a characteristic thereof in response to application of said test signal thereto.

10. Apparatus for measuring the modulation deviation of a frequency modulated microwave relay station which includes an incoming frequency modulation receiver having a frequency discriminator, a video amplifier and an outgoing transmitter frequency modulated by the amplified signal from the amplifier; said apparatus including in combination, frequency modulated test transmitter means for producing a modulated test signal, means for coupling said test transmitter means to the incoming receiver for applying said test signal to the input thereof, test receiver means, means for coupling said test receiver means to the outgoing transmitter for receiving the output therefrom, test meter means for indicating the frequency deviation of a modulated wave applied thereto, and switch means connected to said test meter means and including a first conductor adapted to be connected to the incoming receiver ahead of the frequency discriminator thereof and a second conductor connected to said test receiver means for providing the modulated signal from said outgoing transmitter, said switch means selectively connecting said test meter means to the incoming receiver of said relay station and to said test receiver means, so that the indication on said test meter means when connected to the incoming receiver and to said test receiver means may be compared to thereby compare the deviation of the signal received by said relay station to the signal transmitted thereby, said test transmitter means including means for producing a modulating signal having a predetermined value and means for coupling said modulating signal to the input of the video amplifier, whereby an indication of the deviation of said outgoing signal for a modulating signal of said predetermined value is produced on said test meter means when connected to said test receiver.

11. Apparatus for adjusting the modulation deviation of a frequency modulated microwave radio relay station which includes an incoming frequency modulation receiver of the superheterodyne type having an intermediate frequency amplifier, an adjustable gain amplifier, and an outgoing transmitter that is frequency modulated by the amplified signal from the adjustable gain amplifier; said apparatus including in combination, an auxiliary frequency modulated microwave transmitter having a source of modulating voltage for producing a frequency modulated test signal, means for coupling said auxiliary transmitter to the incoming receiver, an auxiliary test receiver of the superheterodyne type having detector means, test meter means connected to said detector means for indicating the frequency deviation of a modulated wave applied to the test receiver, means connecting said auxiliary receiver to the outgoing transmitter, and switching means for selectively connecting said detector of said auxiliary receiver to the intermediate frequency amplifier of the incoming receiver of said relay station, so that the frequency deviation of said test signal in said incoming receiver will be indicated on said test meter means and can be compared with the indication on said test meter means produced by said test signal in the outgoing transmitter.

12. Portable test apparatus for a frequency modulated microwave radio relay station which includes an incoming frequency modulation receiver, a video amplifier, and an outgoing transmitter that is frequency modulated by the amplified signal from the amplifier, and which apparatus requires interrupting communications through the relay station for a short test interval; said apparatus including in combination, frequency modulated microwave test transmitter means for producing a modulated test signal, wave guide means for connecting said test transmitter means to the incoming receiver, said wave guide means including a wave guide switch having a movable vane within said wave guide means for diverting the flow of microwave energy therethrough from the incoming receiver and absorbing means in said wave guide means for absorbing the microwave energy therein, said switch being operable to move said vane and said absorbing means to inoperable positions with respect to said wave guide means for momentarily coupling the test signal to the incoming receiver during the test interval to thereby interrupt communications through the relay station, and test meter means adapted to be connected to said radio relay station for indicating a characteristic thereof in response to application of the test signal thereto.

References Cited in the file of this patent

UNITED STATES PATENTS

| | | |
|---|---|---|
| 2,250,950 | Goldsmith | July 29, 1941 |
| 2,285,851 | Byrne | June 9, 1942 |
| 2,287,044 | Kroger | June 23, 1942 |
| 2,296,384 | Hansell | Sept. 22, 1942 |
| 2,379,069 | Dysart | June 26, 1945 |
| 2,445,708 | Crosby | July 20, 1948 |
| 2,558,129 | Favre | June 26, 1951 |
| 2,597,043 | Treadwell | May 20, 1952 |
| 2,635,183 | Smith et al. | Apr. 14, 1953 |